Feb. 6, 1951 R. H. RANGER 2,540,406

MAGNETIC RECORD EDITING APPARATUS

Filed Sept. 13, 1947 2 Sheets-Sheet 1

INVENTOR:
Richard H. Ranger,
BY
Raphaël Tuorvet
ATTORNEY.

Feb. 6, 1951 R. H. RANGER 2,540,406
MAGNETIC RECORD EDITING APPARATUS
Filed Sept. 13, 1947 2 Sheets-Sheet 2

INVENTOR:
Richard H. Ranger,
BY
Raphaël Tuerovy
ATTORNEY.

Patented Feb. 6, 1951

2,540,406

UNITED STATES PATENT OFFICE 2,540,406

MAGNETIC RECORD EDITING APPARATUS

Richard Howland Ranger, Newark, N. J.

Application September 13, 1947, Serial No. 773,793

8 Claims. (Cl. 179—100.2)

The present invention relates to improvements in sound reproducing systems and is especially adapted for use in conjunction with processes of magnetic recording and reproduction of sounds using a recording tape or wire, although it can also be employed in any signal reproducing system. More particularly, the invention relates to a simple and efficient device which greatly facilitates the location of recorded words, phrases, tones or sounds, wherever they may appear on a given length of recording tape or wire.

In the usual magnetic sound recording and reproducing system, a paramagnetic recording medium, such as a steel wire or steel tape, or a tape coated with fine paramagnetic particles, is caused to pass close by the pole faces of a series of electromagnets, hereinafter called heads, whereby the following operations are successively accomplished: first, an erasing head either removes any previous recording or smooths out any magnetic irregularities in the recording medium; second, a recording head puts on the tape the magnetic variations which constitute the record corresponding to the desired tone modulations, i. e. to the original sounds; and finally, a play-back head picks up from the tape the magnetic variations produced in the tape by the recording, and leads the resultant current pulses to amplifier and loud-speaker equipment to give a suitable audible reproduction of the original sounds.

Where a straightforward recording or play-back is desired, these erasing, recording and play-back heads are held stationary and the recording medium passes by them in succession. There are provided, of course, motorized reels on each side of the heads to deliver and take up the recording medium. After a recording has been made, the tape is rewound on the delivery reel. If it is desired to reproduce the recorded tape, the erasing and recording heads are completely de-energized, and only the play-back head functions as the tape moves forward.

The instant invention relates primarily to the reproduction phase in the use of the machine, and especially in situations where it is desired to find a particular spot on the recording medium associated with a specific word, phrase, tone or sound.

With the conventional recording system, now in use, it is possible to locate the general portion of the recording medium which carries a specific sound, by playing the machine and stopping it quickly when the sound is heard. However, since the recording medium moves at a considerable linear speed, this procedure does not permit the definite location of the specific sound. Of course, by repeatedly reversing the direction of travel of the tape and re-playing, the desired spot can be localized more accurately. This, however, is a laborious and time consuming operation. It is, therefore, the object of this invention to provide a simple and effective apparatus for spotting quickly the exact location of any desired part of a recording made on a magnetic tape or wire.

In accordance with the present invention, a play-back head is rigidly though adjustably mounted on a rotatable supporting drum and means are provided for locking the drum and, hence, the play-back head in a stationary position for the normal reproduction of the sounds recorded on a magnetic tape which is advanced in operative proximity to the play-back head; resilient means are provided for moving the supporting drum from its locked stationary position when the locking means are released, and to bring it into engagement with a driving connection for rotating the drum, to facilitate the precise location of the spot on the tape associated with any desired sound.

The invention will be better understood from the more detailed description hereinafter, in which reference will be made to the accompanying drawings which illustrate a magnetic sound reproducing apparatus embodying my invention and in which Figure 1 illustrates in perspective view the arrangement of the essential elements of an apparatus for carrying out my invention;

Figure 1:
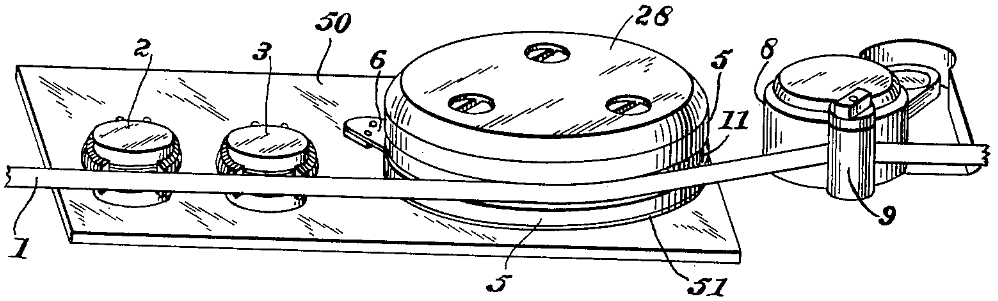
Figure 2:
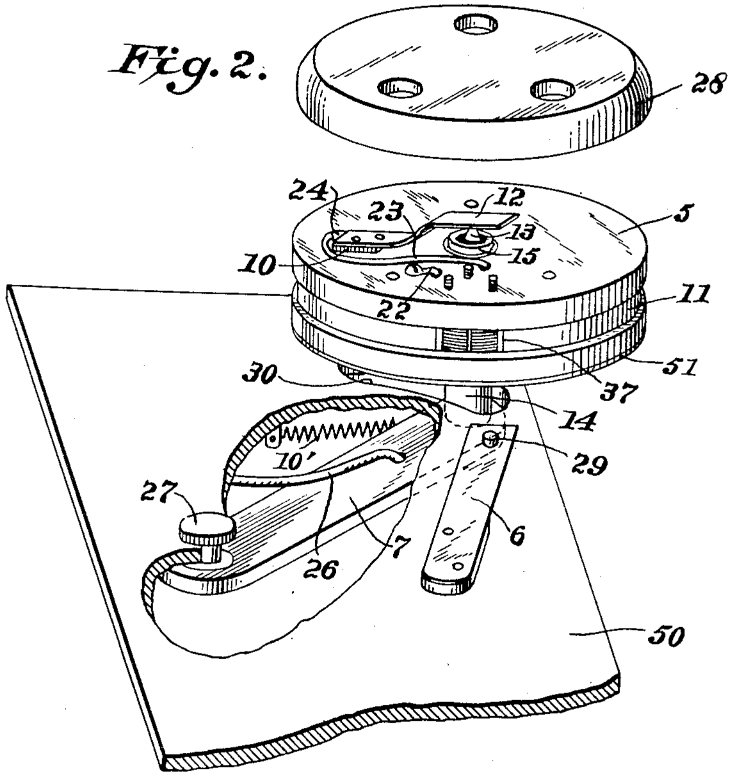
Figure 2 is a perspective view of my novel drum for supporting the play-back head, with the cover of the drum in raised position, detached from said drum.
Figure 3:
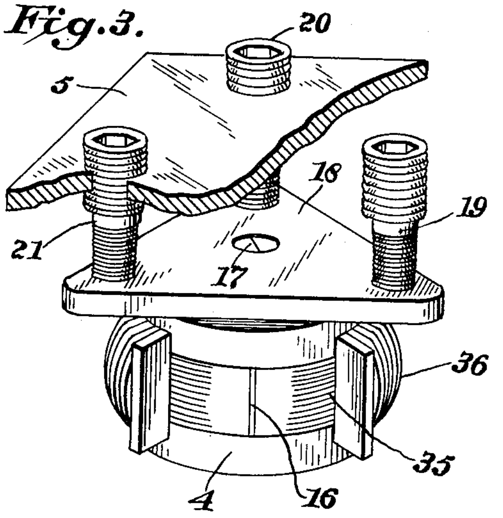
Figure 3 is a perspective view of a detail.

Referring to the drawings, 50 represents the main frame of the machine on which are successively mounted an erasing head 2, a recording head 3 and a play-back head 4, the latter being mounted in a recess in a rotatable, supporting solid metal drum designated as a whole by the numeral 5 in the drawings. The tape is drawn past these three heads in the customary manner by passing the tape between the synchronous speed spindle 9 and the idler capstan 8 which free to move both about its own shaft 14 and about pin 27. Under the influence of the biasing spring 10' fastened to the support 50 and to the arm 7, the drum moves about pin 27 and takes up the position shown in Figure 4, a suitable recess 30 in the plate 50 permitting the pivotal motion of shaft 14 of drum 5. In this position, the drum contacts the capstan 8 and is adapted to be driven by the latter when the spindle 9 is rotated.

Figure 4:
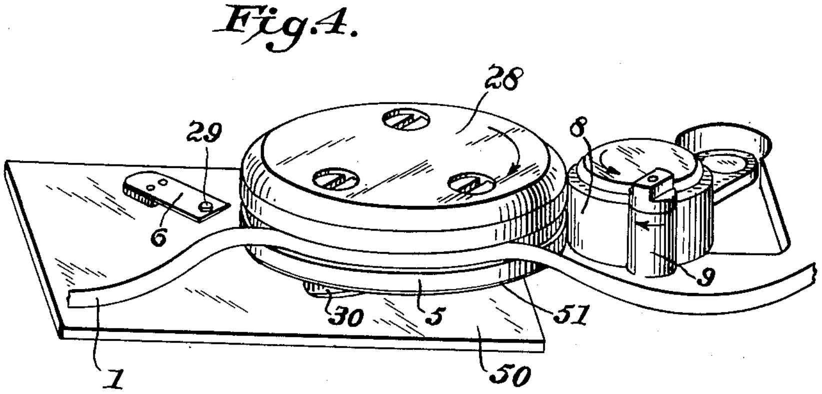
Figure 4 shows in perspective view the relative positions on the apparatus of the play-back head and associated drum when used according to the present invention.
Figure 5:
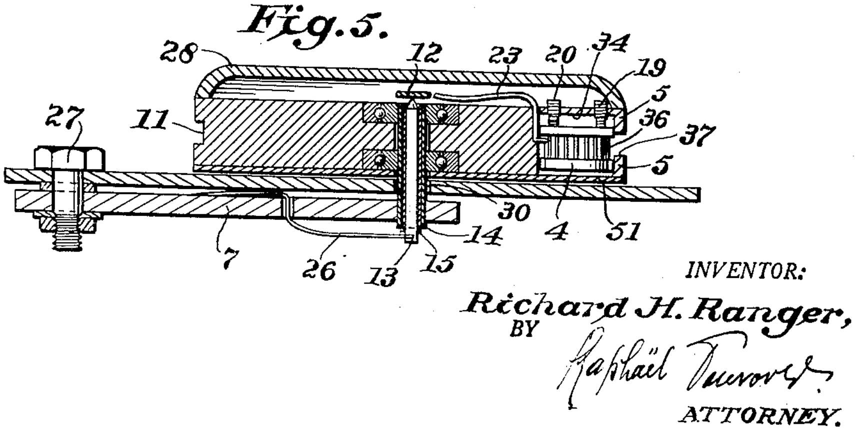
Figure 5 is a cross-section through the drum and its supporting plate.

The operation of my device will now be described. When it is desired to "spot" a particular sound or word on the tape, the drum 5 will be held in the stationary position shown in Figure 1 with the projecting end of stop 6 engaging in the recess in the under side of the drum 5 and cover plate 51. Under these conditions, the play-back head 4 will occupy its normal position in the usual method of reproduction. The reel motors and spindle 9 are actuated to feed the tape past the play-back 4 at the normal speed until the desired sound has been generally located. At this moment, the machine is quickly stopped and the tape is removed from its position between the capstan 8 and the spindle 9. Also, the reel motors are thrown out of action so that there will be no tendency for the tape to move except as done manually. The spring-stop 6 is now disengaged from its recess on the drum 5, which unlocks the drum and allows it to move freely. Thereupon, the drum 5 on arm 7 is pulled by spring 10' which moves the arm with the drum to a position where the drum engages with the idler capstan 8, as shown in Figure 4. At this time, the synchronous motor is started which now rotates the drive spindle 9. This in turn drives the capstan 8 in the opposite direction. The capstan in turn drives the drum 5, carrying the play-back head 4, and rotates it in the same direction as the spindle 9, all of these rotations being as indicated by the arrows in Figure 4.

The short section of the tape to be inspected, which has on it the desired sound to be accurately spotted, is now held manually against the rotating drum, so that for approximately a quarter turn of the drum, the play-back head 4 is in contact with this particular section of the tape. The short section of tape is thus scanned for this period at the same rate and in the proper direction to make it sound exactly as it would were this same short portion being pulled past the stationary play-back head in the normal manner. It will be appreciated that, since the scanning is repeated with each revolution of the drum as long as the tape is held against it, the short phrase or note is also repeated and, by moving the tape back and forth slowly in front of the rotating drum, the exact incidence of any sound can be located on the tape. When this has been done, the back of the tape may be marked with a wax pencil to indicate any specific spot. The termination of the sought-for sound, or phrase, can be found in a similar manner. If it be required to remove this section, the tape will be cut at the two places and the ends joined with a cement suitable for the tape being used. For the vinyl type of tape, a suitable mixture has been found to be a dilute solution of glycohexanone in methyl ethyl ketone. If the sound to be eliminated is a very brief one, it can be eliminated by switching an erasing current to the erasing head and carefully moving the marked place of the tape manually over the erasing head.

It should also be noted that the intensity of a sound on the tape can be erased to a varying degree, depending upon the extent that the tape covers the vertical gap of the erasing head as it is passed over the erasing head. That is, if only half the width of the tape is exposed to the erasing action of the head, which can be accomplished by suitably adjusting the vertical position of head 2 in the manner described above, the signal will be only reduced by half. Of course, care must be exercised to insure that the slight magnetic carry over on the sides of the effective area of the erasing head does not make too great an erasure.

With this invention, it is possible to replace a correct musical note for a poor or false one. To this end, the bad note is first located and erased. Then a correct note may be recorded on a separate piece of tape. The note is then exactly located on this new piece of tape using the herein described word spotter, and its position marked on the back of the new tape. The new tape is then cut to provide a section which includes as much of this new note as is desired, and this cut section is then pasted on to the original tape so that the location of the new note is superimposed on the old note as closely as possible. The active magnetized coating of the new tape is naturally to be placed uppermost with its marked back pasted to the active side of the original tape which held the bad note.

While in the foregoing description of a practical embodiment of my invention the recording medium has been specified as having the form of a tape, it is to be understood that a wire could be handled in the same manner with equal facility.

I claim:

1. In a signal reproducing system in combination a tape, a play-back head mounted on a rotatable support, means for locking said head in a stationary operating position, said tape being advanced at a normal reproducing speed in operative proximity to the play-back head when the latter is in locked position, and a single means for rotating said head at a normal reproducing speed when the head is in unlocked position and for advancing said tape in operative proximity to the play-back head when the latter is in locked position.

2. In a magnetic sound reproducing system in combination a tape, a play-back head mounted in a rotatable support and comprising an electromagnet having pole faces, means for locking said play-back head in a stationary operating position, said tape being moved at a normal reproducing speed in operative proximity to said pole faces when the play-back head is in locked position, and a single means for rotating said head at a normal reproducing speed when the head is in unlocked position and for advancing said tape in operative proximity to the play-back head when the latter is in locked position.

3. In a system according to claim 2, wherein the play-back head is mounted in a recess in a rotatably mounted drum, and a driving connection between said drum and the means for advancing the tape.

4. A device of the class described comprising a play-back head, a support for said head rotatable about a shaft, means for locking said support against rotation whereby the head is held in a stationary position, means for automatically moving said support about a pivotal bearing upon release of said locking means, and means for rotating said support about said shaft upon movement thereof from its locked position.

5. A device according to claim 4, wherein resil-